(12) United States Patent
Hawksworth

(10) Patent No.: US 6,970,175 B2
(45) Date of Patent: Nov. 29, 2005

(54) DIGITAL PREPRESS COLOR MIXING TOOLS

(75) Inventor: Wayne Hawksworth, Heatherton Village (GB)

(73) Assignee: Imagelinx International Ltd., Nottinghamshire (GB)

(*) Notice: Subject to any disclaimer, the term of this patent is extended or adjusted under 35 U.S.C. 154(b) by 302 days.

(21) Appl. No.: 10/322,848

(22) Filed: Dec. 18, 2002

(65) Prior Publication Data

US 2004/0118310 A1 Jun. 24, 2004

(51) Int. Cl.[7] ............................. G09G 5/02; H04N 5/14; H04N 9/74; G06K 9/00
(52) U.S. Cl. ........................ 345/589; 345/593; 345/597; 348/557; 348/582; 382/162; 382/166
(58) Field of Search ................................ 345/589, 591, 345/593, 597, 700, 723, 765, 600, 629, 690; 382/162, 163, 164, 165, 166, 167; 358/515, 517–518; 348/557, 560, 566, 582, 599, 577, 612

(56) References Cited

U.S. PATENT DOCUMENTS

| | | | |
|---|---|---|---|
| 5,196,927 A | | 3/1993 | Warner |
| 5,249,263 A | * | 9/1993 | Yanker ........................ 345/594 |
| 5,473,738 A | * | 12/1995 | Hamlin et al. ............... 345/594 |
| 5,649,220 A | | 7/1997 | Yosefi |
| 5,809,366 A | * | 9/1998 | Yamakawa et al. ........... 399/39 |
| 5,893,130 A | * | 4/1999 | Inoue et al. ................. 715/528 |
| 5,897,239 A | * | 4/1999 | Caruthers et al. ............. 399/54 |
| 5,909,220 A | * | 6/1999 | Sandow ....................... 345/589 |
| 6,067,073 A | * | 5/2000 | Rae-Smith et al. ......... 345/589 |
| 6,271,861 B1 | * | 8/2001 | Sargent et al. .............. 345/589 |
| 6,381,032 B1 | | 4/2002 | Laverty et al. |
| 6,429,947 B1 | | 8/2002 | Laverty et al. |
| 6,483,524 B1 | | 11/2002 | Petchenkine et al. |

* cited by examiner

Primary Examiner—Matthew C. Bella
Assistant Examiner—Wesner Sajous
(74) Attorney, Agent, or Firm—Gardner Carton & Douglas LLP

(57) ABSTRACT

A digital prepress color mixing tool is described, including suggestions for how to implement the tool within a native artwork production environment, such as Adobe Illustrator™. The invention allows for the prepress work of applying color mixtures to be accomplished without conversion to a proprietary file format, and with improved efficiency. The color mixing tool includes functions for automatically converting dirty colors, quick color mixing, and for modifying overprint settings.

27 Claims, 6 Drawing Sheets

Overall Method

Changed Information

Building List From
Selected Objects

DIGITAL PREPRESS COLOR MIXING TOOLS

FIELD OF THE INVENTION

This invention generally relates to color reproduction of digital artwork. More specifically, the invention relates to software tools for prepress color mixing of digital artwork.

BACKGROUND OF THE INVENTION

Color artwork, which often includes a plurality of graphic or text objects, may be reproduced using any of a variety of different printing processes, including offset lithography, gravure, silk screening, or flexography. For an accurate reproduction of color variations using these methods, two or more different inks are applied, for example, to separate lithographic plates. Generally, three different ink colors (and hence three different lithographic plates) are needed to approximately reproduce the spectrum of colors seen with a human eye. However, in some cases, for example, where only gray tones are needed, only two inks are used; in others, for example, where an especially bright or dark color is desired, more than three inks may be used.

Conventionally, a specific mixture of colors, called "process colors", have been used in commercial printing processes. Process colors are mixed from four "pure" process colors, which include cyan, magenta, yellow, and black, or "CMYK". (The "K" refers to black; "B" is not used in order to avoid confusion with blue). Many commercial printing processes use CMYK color inks, either pure or in mixture, to reproduce in print color objects within a piece of artwork. However, in cases where an especially bright or dark shade of color is desired, a separate "spot" color, which requires its own specially mixed ink, may also be used.

Conventional color mixing techniques have several disadvantages, especially for large scale reproduction of color artwork using commercial printing processes. Artists do not usually specify what mixture of CMYK ink should be used to produce a color desired for a particular object in a piece of artwork. Rather, a commercial printer or prepress operator must try to match specified colors as closely as possible, sometimes by trial and error. Unfortunately, some colors specified by artists (for example, metallic or fluorescent colors) are not reproducible using CMYK inks. Where many such colors are present in a piece of artwork, it is infeasible for a plurality of separate non-CMYK inks to be mixed for each color.

Using digital computers, color mixing has been simplified. With a digital computer running dedicated prepress processing software, a user of the software (e.g., a prepress operator) may specify what particular blend of CMYK pure process color inks should be used to "fill" objects within a piece of digital artwork. When colors are specified digitally, errors are minimized during print processing since printers spend less time determining what mixture of inks was intended. But the use of conventional prepress software does not eliminate the need for an artist or prepress operator to assign to each object within a piece of digital artwork a specific digital mixture of colors. Conventional prepress processing software include the Esko-Graphics Barco™ or Artwork Systems Artpro™ packages. Currently, commercial software packages for prepress processing have several distinct disadvantages.

Some disadvantages to the use of such commercial software packages for prepress processing include the need for file format conversions. The file format of artwork submitted for prepress work is usually different from the file format used by prepress software packages. Finished designs are usually produced in an artwork production environment, such as Adobe Illustrator™ or Macromedia Freehand™, and must be converted from the file format used by the artwork production software into the file format for the prepress software package before prepress processing can be completed. File conversion errors occasionally result.

Other disadvantages of file conversion include an inability of artists to make even minor changes to artwork already submitted for prepress processing. Thus, artwork usually goes through a long approval process before being submitted for prepress processing. Changes after submission may be costly or impossible. A minor change to a small aspect of artwork submitted for prepress processing may require a large amount of additional work to correct. For example, if a company wishes to make a slight alteration to a text object, the prepress processing might have to revert back to the original file (supplied), edit the text, export the text out into a suitable format, import the file into a proprietary format and re-position the amended text.

Attempts have been made to improve the accuracy and efficiency of color management by transferring digital artwork from the native artwork production environment to a server used for digital prepress processing. In systems of this kind, a piece of digital artwork (such as an Adobe Illustrator™ file) is transferred to a server, which does prepress processing to text and graphic objects within the file before transferring the file back to the native artwork production environment. Disadvantageously, the use of a server and network increases the cost of prepress processing (for example, because network bandwidth must be expanded to accommodate transfer of large graphics files back and forth from the server). Also, the use of such servers often requires file conversions, resulting in the same disadvantages described above.

An additional disadvantage to the use of proprietary file formats and software packages is that prepress software packages require extensive training. Hence, additional company resources (beyond those necessary for simply creating artwork) are required for artwork to be prepared for printing. A smaller company might be unable to afford high quality artwork for advertisements or product packaging simply because prepress processing is unaffordable.

There is, therefore, a need for an efficient prepress tool for applying accurate, high quality color mixtures to digital artwork within a native artwork production environment.

SUMMARY OF THE INVENTION

The present invention meets the foregoing need by providing digital prepress color mixing tools designed to function within a native artwork production environment, such as Adobe Illustrator™. The color mixing tools include a color mixing palette, replacing a plurality of existing tools with a single, integrated digital workspace for color mixing and application.

In accordance with the method and system of the present invention, colors are mixed and applied to objects of text or graphics within a digital file comprising finished artwork intended for printing within the same software package or application in which the finished artwork was created (i.e., within the "native" artwork production environment). A specific mixture of process or spot colors is applied to every graphic or text object included in a piece of digital artwork without any file conversions or transfers. The invention allows prepress operators to see color mixtures that have been applied within the digital artwork immediately.

Using the method and system of the present invention, it is possible for an artist to apply color mixtures as well as single colors, removing the need for separate prepress processing of artwork before printing, and allowing for easier revisions or updates to previously finished artwork. In an embodiment, text in the artwork is not converted to paths, files are not saved in a non-native format or converted to a proprietary software system, and there is no need for files to be reconverted after prepress processing before being viewed.

According to the method and system of the present invention, after digital artwork has been approved by a client, the invention is applied in a native artwork production environment, eliminating the need for a conversion of the digital artwork into a different format. After the method of the present invention has been carried out, the digital artwork may be submitted for print processing, for example, as a PostScript format file. A Raster Image Processor (RIP) is used for screen ruling, dot gain analysis, and angle, dot shape or structure assignment. The digital artwork might then be sent to an output device, such as a plate or film setter. For gravure printing, the bitmap data is either sent to a digital engraving machine or data is output to film, and engraved on a cylinder. No digital prepress color mixture processing outside the native artwork production environment is required.

In an embodiment, the invention has been implemented as a plug-in for use with Adobe Illustrator™. However, as will be understood by those of ordinary skill in the art, the method and system of the present invention are susceptible to implementation in a plurality of different artwork production environments, including environments in which the prepress tools are implemented without reference to previously developed Application Programming Interface (API) or other libraries of software tools. The invention should be understood to include such alternative embodiments since the color mixing tools described herein might be implemented by one of ordinary skill in the art in any such alternative embodiments.

In many conventional artwork production software packages, digital artwork is output as a PostScript language file. Hence, much of the terminology used to describe how colors are mixed and applied in the present invention is common to the PostScript programming language. An excellent reference, including a detailed description of some of the PostScript language terms and concepts used in the present application (e.g., paths, Bezier curves, and sign conventions used for specifying insideness) is publicly available at http://partners.adobe.com/asn/developer/technotes/postscript.html in the third edition of the PostScript Language Reference manual. The digital prepress color mixing tools of the present invention are implemented, in an embodiment, as a plug-in for Adobe Illustrator™, a commercial artwork production software package that has conventionally produced PostScript format output files. Any artwork production environment using vector graphic objects could be used to implement the digital prepress tools of the present invention.

The digital prepress tools of the present invention allow a user to mix and apply colors to vector art objects and text items within a design. The following terms are used in accordance with the present invention: "swatch color" refers to a user defined color, which would conventionally appear, for example, in the "Swatches" palette in Adobe Illustrator™; "process color" refers to a combination of cyan, magenta, yellow and black (or "CMYK"); "process global color" refers to a process color that is formally defined within the native artwork production environment (for example, in the "Swatches" palette in Adobe Illustrator™); "spot color" refers to a specially premixed color used with its own printing device (for example, with a separate lithographic plate); "pure process global color" is a process color that is defined to be a global and set to be 100% of a single process color; a "dirty color" is a process color that is not 100% of a single process color and not set to be a global color. The pure process global colors include "pure process cyan", "pure process magenta", "pure process yellow", and "pure process black", which are conventionally defined as shown in Table 1. Table 2 shows, by way of example, a set of dirty colors, which may be converted into a mixture of pure process global colors using the method and system of the present invention.

TABLE 1

| PURE PROCESS GLOBAL COLOR | MIXTURE | | | |
|---|---|---|---|---|
| Pure Process Cyan | 100% Cyan | 0% Magenta | 0% Yellow | 0% Black |
| Pure Process Magenta | 0% Cyan | 100% Magenta | 0% Yellow | 0% Black |
| Pure Process Yellow | 0% Cyan | 0% Magenta | 100% Yellow | 0% Black |
| Pure Process Black | 0% Cyan | 0% Magenta | 0% Yellow | 100% Black |

TABLE 2

| DIRTY COLORS | MIXTURE | | | |
|---|---|---|---|---|
| Process Cyan | 99% Cyan | 0% Magenta | 0% Yellow | 0% Black |
| Process Magenta | 12% Cyan | 100% Magenta | 0% Yellow | 0% Black |
| Process Yellow | 0% Cyan | 1% Magenta | 100% Yellow | 1% Black |
| CMYK Red | 5% Cyan | 99% Magenta | 86% Yellow | 2% Black |

A significant advantage of the present invention is that the invention allows for nonstandard process colors that are defined differently from the pure process global colors shown in Table 1 to be converted into a combination of pure process global colors within the native artwork production environment. Conventional methods and systems for color mixing have required for colors defined in digital artwork, such as Adobe Illustrator™ files, to be converted into a proprietary prepress file format before being converted to pure process global colors (shown in Table 1).

In accordance with the present invention, a "path" is a graphic object specified by logically connecting at least two points. The path may be rectilinear or may be curved as specified, for example, by designating the points as knots in a Bezier curve. Paths may be "closed" so that it has a well-defined interior portion, or "open". Paths may also be "stroked" so that the logically connected points in the path are physically connected by lines, or, in cases where the paths are closed, "filled" so that the interior portion of the path has a well-defined color. A closed path may be stroked, filled, both, or neither. "Compound paths" are objects that include one or more other paths. Paths that are included as part of a compound path are called "subpaths". Any kind of digital artwork having paths, vectors, or other similar system for specifying the position of text or graphic objects is susceptible to being adapted for use with the present invention. In an embodiment, the digital prepress color mixing tool allows for the color or colors assigned to a closed, filled path to be reassigned to a combination of pure process global colors or spot colors.

In an embodiment of the present invention in which the native artwork production environment is Adobe Illustrator™, the present invention provides a palette plug-in tool, which extends or replaces the functionality provided by existing "Appearance", "Swatch", "Color" and "Attributes" palettes. Existing palettes or toolbars in Adobe Illustrator™ are generally cumbersome or difficult to use for digital prepress color mixing, as taught by the method and system of the present invention. The color mixing tool of the present invention allows for valid colors and color combinations to be mixed and applied to multiple fills in a more accurate, well-defined way. Using the method and system of the present invention, colors and color combinations are displayed or managed so that a user (for example, an artist or prepress operator) can prepare digital artwork for color separation and printing processes without a need for digital prepress processing outside the native artwork production environment.

Advantageously, the present invention includes (in one embodiment) a color mixing palette that displays only valid mixtures of colors for an object based on overprint settings for the object and the order in which colors have been applied to the object. By restricting the display of colors to valid mixtures, the present invention limits the number of problems, which may be experienced after finished artwork is sent for print processing. Another important advantage of the present invention is embodied in a method and system for converting dirty process colors to an equivalent mixture of pure process global color equivalents automatically.

In an embodiment, a user of present invention activates a refresh function of the color mixing palette in order to fetch and display all global, spot, and standard colors used in fills within a piece of digital artwork, such as an Adobe Illustrator™ file. In some embodiments, patterns, vignettes, or other color variants are not displayed in the color mixing palette. In such embodiments, color variants may be displayed in a separate color variants palette, or may not be displayed at all.

In another embodiment, after a refresh function has been activated within a color mixing palette, specific ink mixture percentages appear in the color mixing palette. For each object, or for a group of selected objects within a piece of digital artwork, a mixture of specific ink percentages is displayed. Optionally, the display may include an index number of the total number of dirty or unsupported colors included in a piece of digital artwork. After selecting one or more objects within a piece of artwork, a function may be activated by the user, which applies a specific mixture of valid ink percentage values to the one or more objects. In some embodiments, the palette indicates when a particular percentage requires user action by italicizing the particular percentage.

In another embodiment of the present invention, a user activates a "swatch options" dialog box, which allows the user to create a new color from a specific mixture of inks. The new color is then added to the color mixing palette, the swatch list palette, or both. In yet another embodiment, a similar function is used to remove or delete colors from one or more palettes.

In yet another embodiment, the present invention includes a "swatch generator" dialog box or window designed for generating a preferred list of colors. Using the swatch generator window, a user of the present invention may load from memory or from a file a stored list of colors for use as the preferred list of colors in the native artwork production environment. The generator window also allows, in an embodiment, for specific characteristics of each color in the list of colors (for example, CMYK percentage values, proofing device identity, ink manufacturer brand names and color codes) to be modified and saved to memory or other storage media (such as a hard disk drive). Using the generator window, a "swatch list" of clean colors may be created from a list of dirty colors, without destroying information originally associated with the list of colors (such as proprietary color names). Using the swatch generator, a prepress operator who has received a list of a plurality of dirty colors can associate each dirty color with a well-defined ink manufacturer brand name color code (as a spot color) or with a specific mixture of pure process global colors. The list of clean colors is then used within the native artwork production environment for digital prepress color mixing. Later, a user of the present invention may reload the list of dirty colors using the swatch generator, if desired.

In still another embodiment, the present invention includes an "overprint" function, which allows for all color attributes of a selected object to have an overprint option enabled. When multiple objects are selected, the present invention may include an indication that some colors in a color mixing palette are not present in all selected objects, for example, by placing a minus sign beside such colors.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

Figure 1:
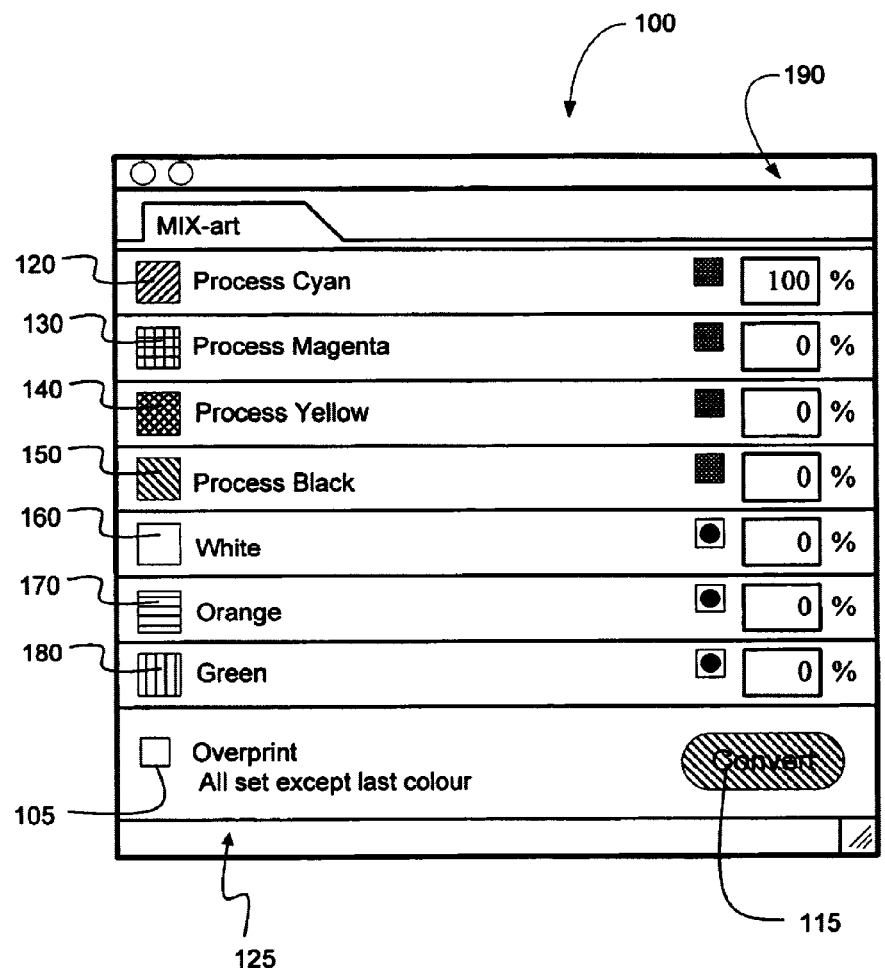
FIG. 1 shows a screenshot of a color mixing tool, in accordance with an embodiment of the present invention.

As described above, the digital prepress color mixing tool may optionally be implemented as a plug-in for Adobe Illustrator™. FIG. 1 shows a screenshot of a color mixing tool 100 in accordance with an embodiment of the invention implemented within Adobe Illustrator™.

The color mixing tool 100 is designed to integrate and extend the functionality of a plurality of existing palettes within Adobe Illustrator™. As shown by way of example in FIG. 1, the color mixing tool 100 includes a list of the process colors: process cyan 120, process magenta 130, process yellow 140, and process black 150. Also included in the example of the color mixing tool shown in FIG. 1 are spot colors white 160, orange 170, and green 180. If the object or group of objects currently selected in the native artwork production environment included dirty colors, a message would appear in the bottom 125 at the bottom of the palette window, with a message indicating the number of dirty colors (for example, "Object has 3 dirty colors"). Each color has a color mixture percentage value 190 assigned.

In the embodiment shown in FIG. 1, the color mixing tool 100 also includes an overprint 105 button and a convert button 115 for setting selected objects to overprint or for converting selected dirty colors to pure process global colors, respectively. The convert button 115 is greyed-out because there are no dirty colors to convert in the example shown in FIG. 1. Thus, the color mixing tool 100 will change as different objects are selected, and as different functions of the color mixing tool are activated. For example, a message will appear at the bottom of the palette window, if dirty colors are selected, and the convert button 115 would not be greyed-out. The message disappears and the convert button 115 returns to a greyed-out state after the convert button 115 has been activated.

Figure 2:
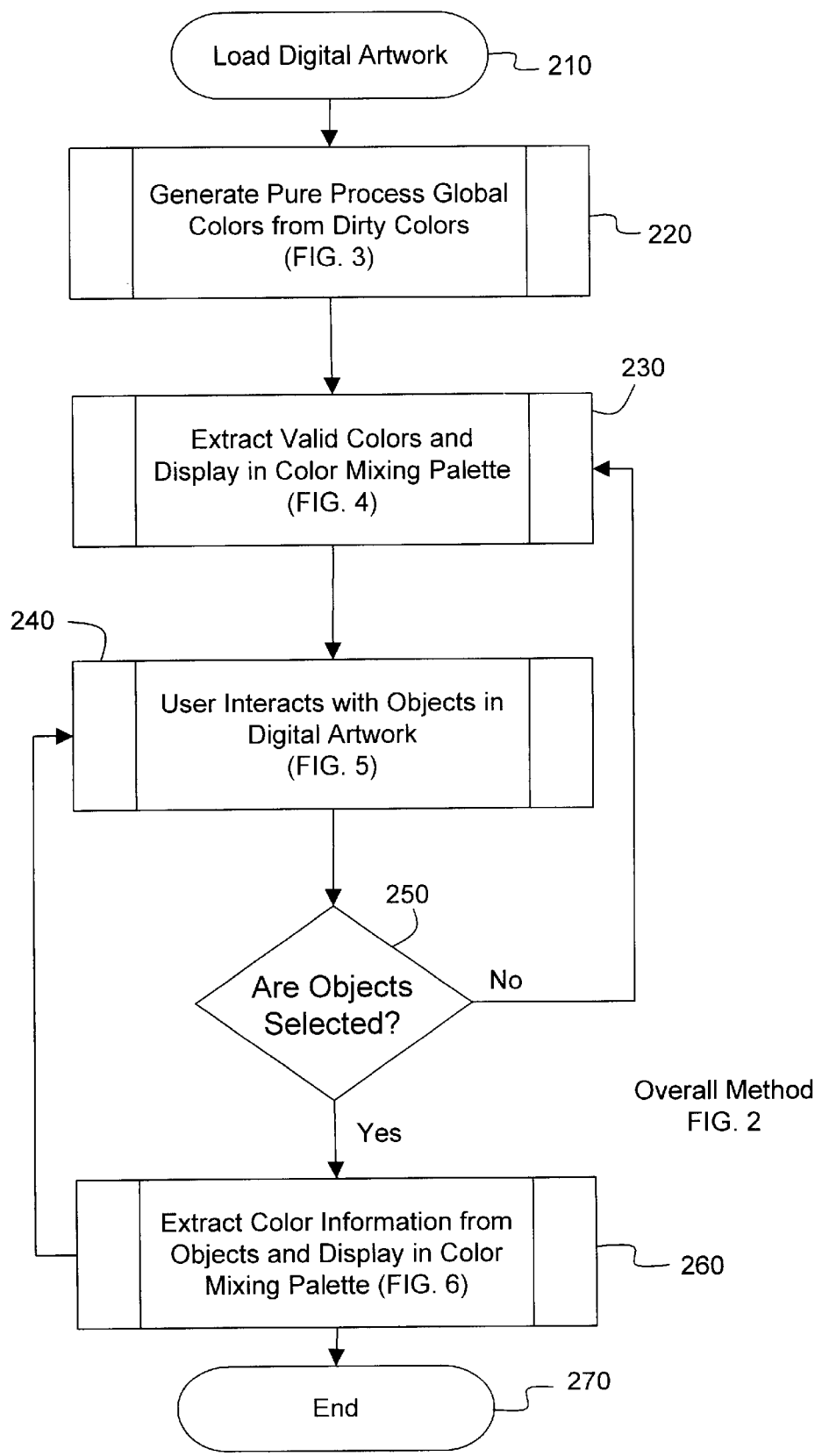
FIG. 2 shows a flowchart of an overall method for color mixing, in accordance with an embodiment of the present invention.

A flowchart showing an overall method for color mixing with a color mixing tool 100 in accordance with an embodiment of the present invention is shown in FIG. 2. Using the method shown in FIG. 2, a piece of artwork, such as a digital file, is loaded in step 210, and color mixtures applied to one or more objects within the digital artwork. In an embodiment, only valid digital artwork (i.e., only uncorrupted files that may be opened in the artwork production environment without errors) is capable of being loaded in step 210. Using the method of FIG. 2, color mixtures are applied to a plurality of objects in the digital artwork, so that the digital objects are ready for print processing without additional modification outside the native artwork production environment.

In an embodiment, the method of FIG. 2 is carried out by a software program, which is activated in connection with a palette window, such as the color mixing tool 100 shown in FIG. 1. Alternatively, in another embodiment, the method shown in FIG. 2 is carried out with user commands executed using a different interface, such as a command line, or with a keyboard shortcut (or "hot key"). In another embodiment, the methods activated using the color mixing palette window might be activated using tools in a toolbar, or with tools in a flyout menu in a toolbar. As is known to those of ordinary skill in the art, there are variety of ways to activate the methods of FIGS. 2–6 in an artwork production environment.

Returning to FIG. 2, the overall method continues with analysis of digital color mixtures in the piece of digital artwork loaded in step 210. In the sub-process that begins in step 220, and is shown in more detail in FIG. 3, pure process global colors are generated from dirty colors included in the loaded artwork. After a list of colors present has been generated in step 220, valid colors for use with an intended printing process are extracted in step 230. Step 230 also includes a predefined sub-process, which is shown, in an embodiment, in FIG. 4. The list of colors generated in step 230 is not editable until after step 230 has been completed in one embodiment of the present invention. The steps 210–230 together comprise an initialization phase for the overall method of applying color mixtures, in accordance with the present invention.

Figure 5:
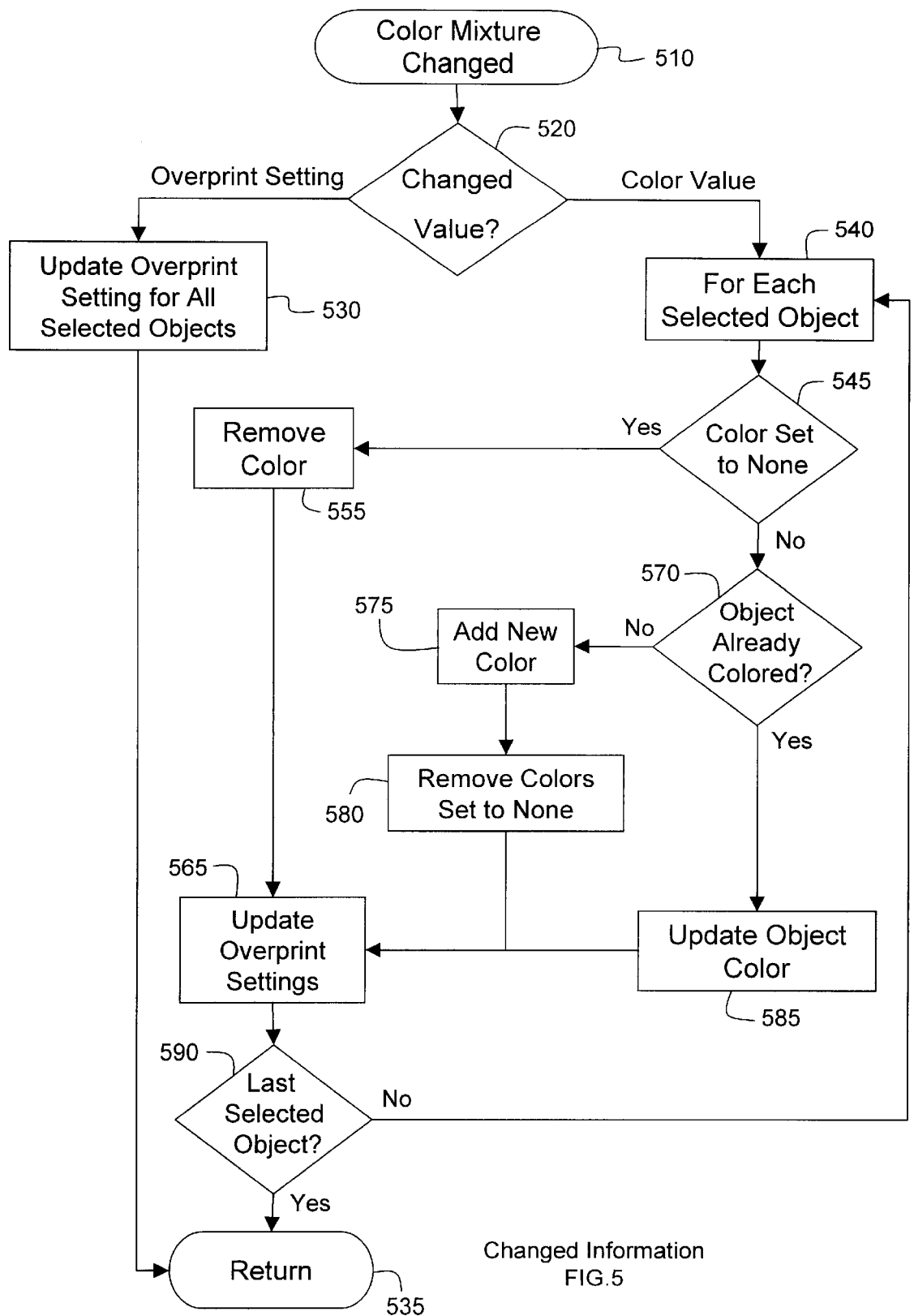
FIG. 5 shows a flowchart of a method for changing object properties, in accordance with an embodiment of the present invention.

After the initialization phase of the overall method shown in FIG. 2, a user action phase begins, in which the method and system of the present invention are passive until there is either: a user action to an object in the loaded digital artwork, or direct user input to the color mixing tool 100. The first step of the user action phase in the embodiment of the overall method of the present invention shown in FIG. 2 is step 240, in which a user acts on an object within the digital artwork loaded in step 210. Since there are various ways in which a user may act on an object, step 240 is also shown as a sub-process, including, in an embodiment, the plurality of steps shown in FIG. 5. The method for managing user actions as shown in FIG. 5 may also be extended to include vignetting or pattern formatting in another embodiment of the present invention, which supports the use of color variants.

In an embodiment, the user action phase of the overall method of the present invention (as shown in FIG. 2) continues, in step 250, by determining whether or not there are selected objects. If not, then the method returns to step 230 so that colors may be extracted from the artwork even though no objects are selected. If objects are selected, then the method continues with step 260, which comprises a subroutine (shown, in an embodiment, in FIG. 6) for extracting color information from objects after color mixtures have been applied. In an embodiment of the present invention, if two or more objects are selected in step 250, the color mixing tool merges the color settings for the two or more objects, and attempts to display color values that are common to the two or more objects. Values that are not common to all of the two or more objects are (in one embodiment) represented with a dash ("-"), a minus sign, or another mark to indicate that a particular color is not present in all selected objects.

An important advantage to an embodiment of the present invention is that changing of color values for a selected group of objects will affect all selected colors, regardless of previous color settings to a particular object within the group of objects. Advantageously, color mixtures are applied to a plurality of objects within a piece of artwork simultaneously, creating a substantial savings of time when there are many objects for which a color mixture must be applied.

The method of step 260 is in place to ensure that color mixtures applied to selected objects meet all requirements for an intended printing process. After step 260, the overall method, as shown in an embodiment in FIG. 2, is complete. Of course, the overall method, an embodiment of which is shown in FIG. 2, may be repeated for a different piece of artwork loaded in step 210 (or even for the same piece of artwork).

The present invention makes use of a method of applying color mixtures in which all colors (except spot colors) are created by overprinting a combination of pure CMYK color values (pure process cyan, pure process magenta, pure process yellow, and pure process black). In accordance with the method and system of the present invention, it is unnecessary for a user to check by hand whether reserved colors in a piece of digital artwork are supported. The present invention includes a method for generating a list of colors, as shown, in an embodiment, in FIG. 3.

Figure 3:
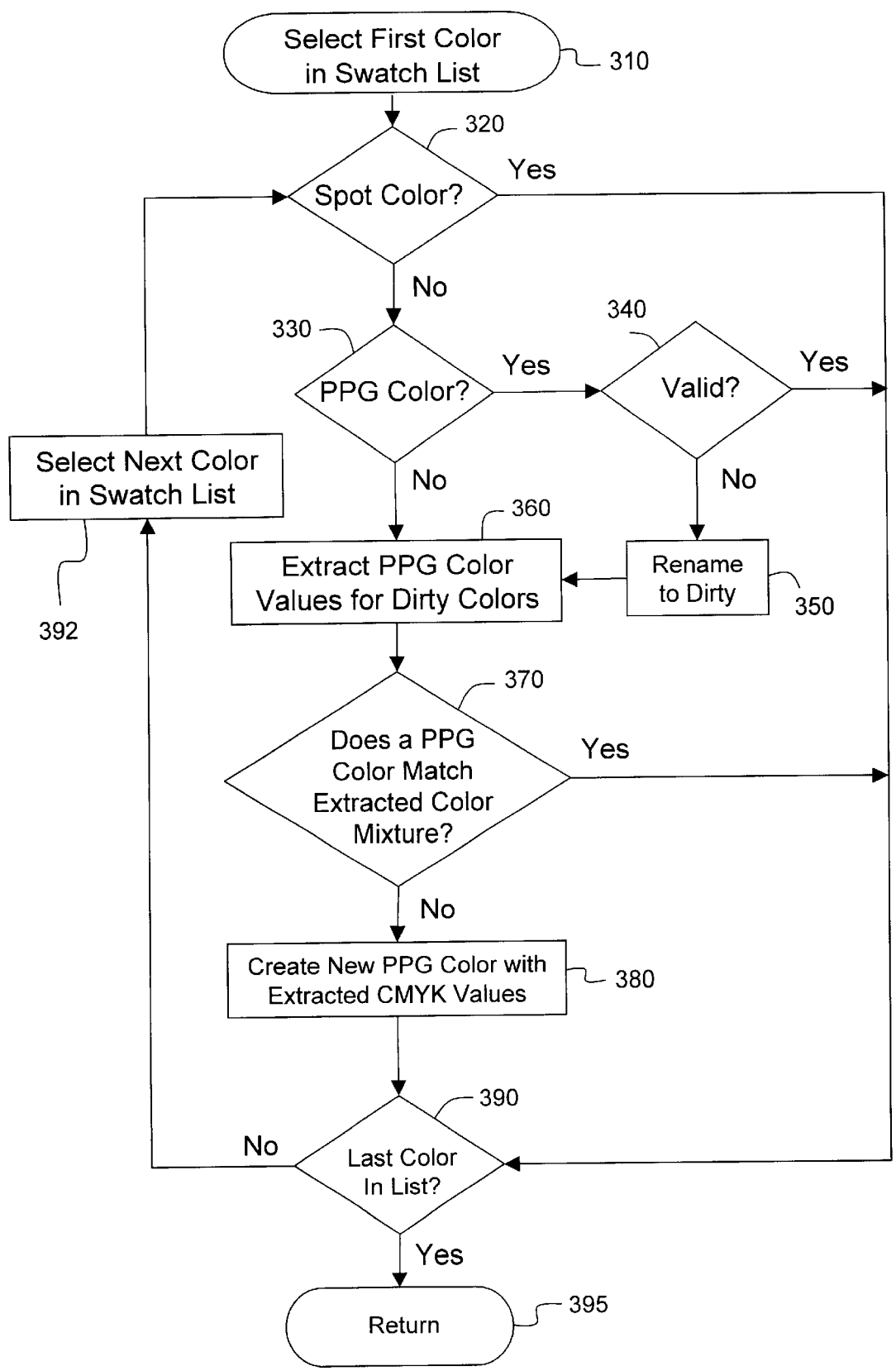
FIG. 3 shows a flowchart of a method for pure process global color generation, in accordance with an embodiment of the present invention.

Referring to FIG. 3, there is shown how, in step 310, a first color in a list of colors (sometimes called a "swatch list" by those in the art), which is loaded from a piece of digital artwork (in step 210 of FIG. 2), is selected. In an embodiment of the present invention in which the digital artwork is an Adobe Illustrator™ file, the list of colors may appear in a "Swatches" palette. Next, the selected color is checked, in step 320, to see whether or not the selected color is a spot color. As described above, spot colors are provided by specially mixed inks, and if the color is provided by a spot ink, then the method proceeds by checking (in step 390) whether the selected color is the last in the list of colors loaded. If the selected color is not a spot color, then the method continues by checking whether the selected color is named as a pure process global ("PPG") color.

As described above, PPG colors include pure process cyan, pure process magenta, pure process yellow, and pure process black (CMYK). If, in step 330, the selected color is named as a PPG color, then the method proceeds with step 340, in which the selected color is checked for validity. If the selected color is named as a PPG color, and if the named color is found to be valid in step 340, then the method proceeds by checking to see if the selected color is the last in the list of colors in step 390. If the selected color is named as a PPG color that is found invalid, then the method continues in step 350 by renaming the selected color as a dirty color, and by extracting the dirty color into pure process global CMYK color values in step 360. If, in step 330, the selected color is not named as a PPG color, then the extraction of step 360 is performed immediately.

Once a dirty color has been extracted into pure color equivalents (in step 360), the color may be again compared against PPG colors, to check whether the selected color is close enough to a PPG color to be considered pure. If so, then the method proceeds to step 390, and if the selected color is the last in the list, then the method returns to the overall method of FIG. 2. If not, then the method continues with the next color in the list, repeating each of the steps of the method of FIG. 3, as necessary. If, in step 370, the selected color does not match a PPG color, then a new PPG color is created in step 380 (using the extracted color values found in step 360), and the new color is added to the list. The method either continues with the next color in the list, or if the selected color is the last color, the method returns to the overall method of FIG. 2. An important advantage of the present invention includes how, in an embodiment of the present invention, and in accordance with the method shown in FIG. 3, if one of the PPG colors has not been found or created during the method of FIG. 3, then that PPG color is created and added near the top of the list so that all PPG colors are included in the list after the method of FIG. 3 has been carried out. Thus, the present invention ensures that the list of colors includes PPG colors.

Figure 4:
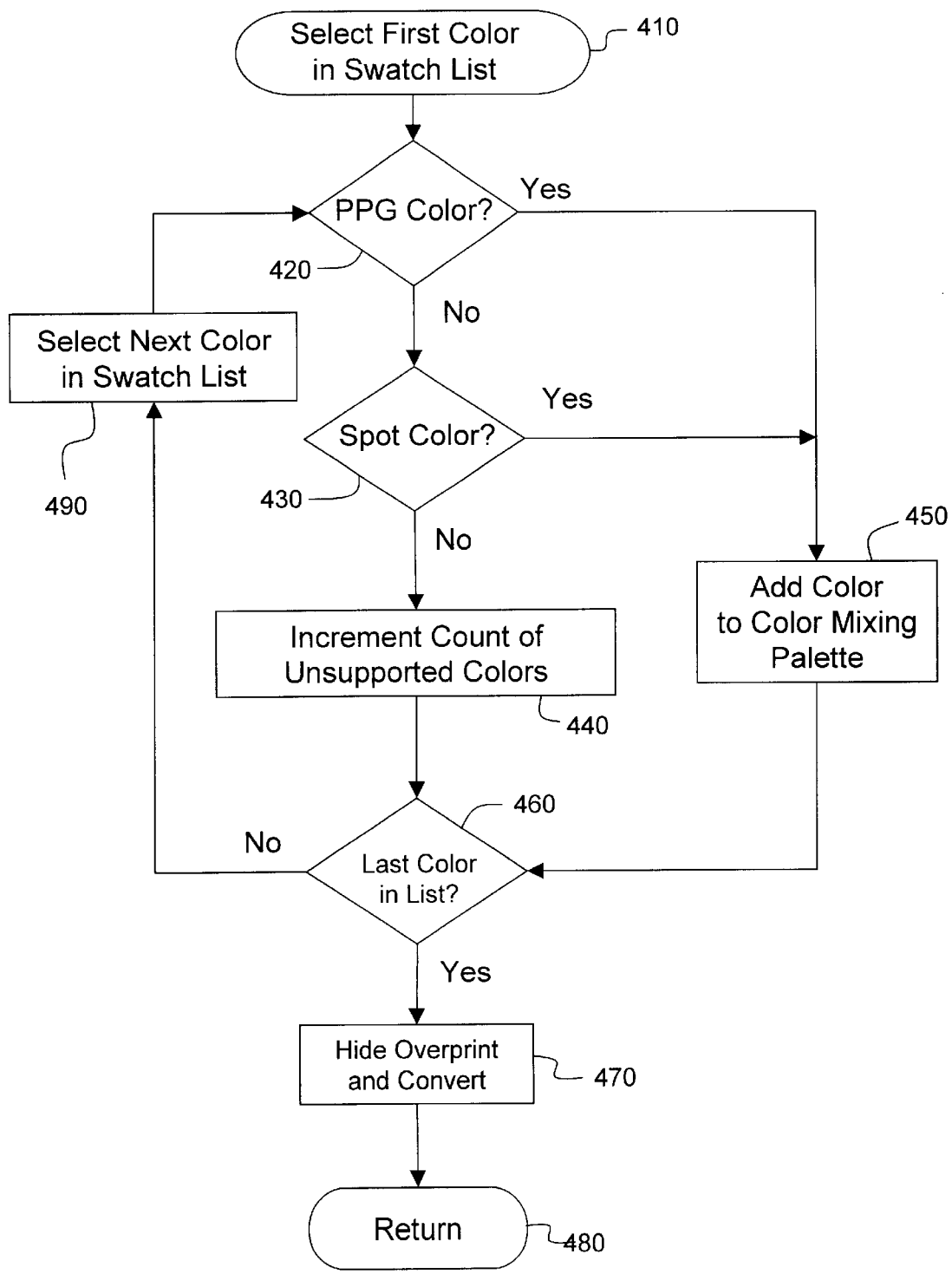
FIG. 4 shows a flowchart of a method for building a color list, in accordance with an embodiment of the present invention.

The present invention provides a method for building a color list when no objects have been selected during a user action phase of the overall method shown, in an embodiment, in FIG. 2. An embodiment of the method for building a color list when no objects are selected is shown in FIG. 4. When no object has been selected, a first color in a list (for example, a swatch list in the "Swatches" palette in Adobe Illustrator™) is selected in step 410. In steps 420 and 430, it is determined whether the selected color is a PPG color or a spot color, respectively. If the selected color is a spot color or a PPG color, then in both cases the method proceeds by adding the color to the color mixing tool (in an embodiment, a color mixing palette) in step 450. If the selected color is not a PPG color or a spot color, then the method proceeds, in step 440, by incrementing a count of the unsupported colors present in the loaded digital artwork. If the selected color is the last color in the list of colors, then the method shown in FIG. 4 finishes by hiding the overprint and covert buttons in step 470, and returning to the overall method of FIG. 2 in step 480. When the selected color is not the last color in the list of colors, then the next color in the list of colors is selected and the method of FIG. 4 repeats. In an embodiment of the present invention, the method of FIG. 4 may be executed whenever a piece of digital artwork is loaded into an artwork production environment, so that a user of the present invention has early notice of how many unsupported colors are being used in a piece of digital artwork.

In accordance with the method of FIG. 4, only PPG colors or spot colors are shown, although in other embodiments non-PPG colors may be shown (for example, in a separate palette). The undefined or unsupported colors are displayed, for example, as a count in the bottom area 125 of the color mixing palette shown in FIG. 1. The convert and overprint buttons are hidden in step 470 of FIG. 4 because when no objects are selected no color mixtures are modified or applied. In another embodiment of the present invention, entire lists of colors may be added, deleted, converted, or otherwise modified using a method similar to that shown in FIG. 4.

Figure 6:
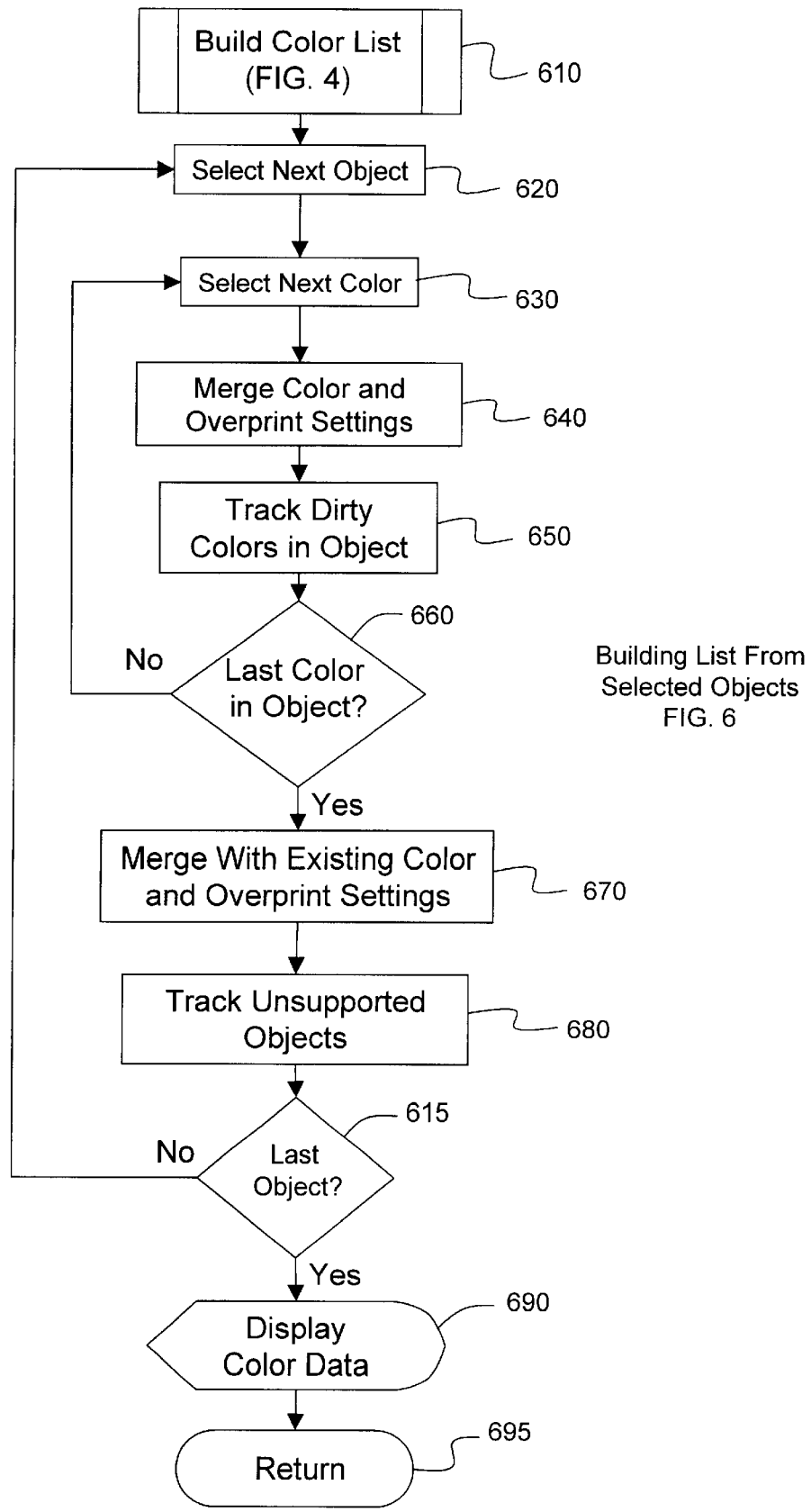
FIG. 6 shows a flowchart of a method for building a color list from selected objects, in accordance with an embodiment of the present invention.

The present invention also provides a method for building a color list when objects have been selected or modified during a user action phase of the overall method shown, in an embodiment, in FIG. 2. An embodiment of the method for building a color list when objects have been selected is shown in FIG. 6. The method of FIG. 6 comprises, in an embodiment, a nested for-loop. As shown in FIG. 6, the method for building a color list when objects have been selected proceeds by first, in step 610 carrying out the method of FIG. 4 for building a color list when no objects have been selected. As indicated by the predefined process box used in FIG. 6, the steps of the method of FIG. 4 are carried out during step 610. After step 610, the next selected or modified object among all of the selected objects is picked in step 620. When step 620 is first executed, the next object will be a first object among the selected objects. For each selected object, a list of colors is available. In step 630, a first color from the list of colors is selected. As with step 620, if step 630 is being executed for the first time in the method of FIG. 6, then the selected color will be the first in the list of colors.

In steps 630–660, colors are merged and analyzed in order to present the selected objects in a format in which the objects would appear after print processing. In step 640, the selected color is merged (color and overprint settings are merged), and in step 650, if the selected color is dirty, then the selected color is flagged for tracking and cleaning later (for example, using the method of FIG. 3). If the selected color is the last color in the list of colors for the selected object, then the method proceeds to step 670. If not, then the next color in the list of colors is selected, merged (in step 640) and tracked (in step 650)—the method repeats until all colors for a selected object have been merged (both color and overprint settings) and tracked.

Once colors for the selected object have been merged and tracked, in step 670, the colors and overprint settings for the selected object are merged with the color and overprint settings for previous objects. (For the first selected object, the merge in step 670 produces the same color and overprint settings.) Also, in step 680, if the selected object (after the merge has taken place) includes unsupported settings, the object is flagged and tracked for later action. If, in step 615, the selected object is the last object in the group of objects selected, then the method proceeds to step 690, in which the resultant merged and tracked color data is displayed, including data for dirty colors and unsupported objects (tracked in steps 650 and 680). After step 690, the method returns in step 695 to the overall method shown, in an embodiment, in FIG. 2. If, in step 615, the selected object is not the last object in the group of objects, then the method of FIG. 6 repeats from step 630 for the next object in the group of objects.

When a list of colors for a piece of digital artwork is built, in accordance with the method of the present invention shown in FIG. 6, as if no objects are selected, all valid colors are created. Only color values and overprint settings from the selected group of objects remain to be filled. In an embodiment of the method of FIG. 6, only colors that have an effect with respect to overprint settings are displayed (see color merge examples described below).

In accordance with an embodiment of the method of FIG. 6, if dirty colors are included in the group of selected objects, then the color settings for each color in the list of colors are not editable until conversion to supported PPG or spot colors (for example, using the method of FIG. 3) has been applied. Unsupported objects (for example, a placed image or raster object) show underlying colors, but are not editable until such unsupported objects are unselected. When the group of selected objects includes more than one object, the colors used in common among the group of selected objects are displayed. If some colors are not used in common, then a dash, minus, sign, or other mark may be used to distinguish the colors not used in common.

In another embodiment of the method and system of the present invention, the overprint settings of objects are displayed. Two supported overprint settings are used in accordance with the present invention: "All Colors Set to Overprint Fill" and "All Colors Except Last Color Set to Overprint Fill". Other overprint combinations are highlighted as incorrect. However, no modifications are made to objects without either direction intervention from a user or a global color value change. When overprint settings are different between selected objects, the color mixing tool shows an "indeterminate" overprint state, indicating that the user must take action.

TABLE 3 shows an example of how, in accordance with an embodiment of the present invention, a list of colors for a selected group of objects is displayed and converted using the method of the present invention. The "ORIGINAL COLORS" column shows colors included for example, with a piece of digital artwork loaded in step 210 of FIG. 2. The "DISPLAYED COLORS" column shows how the colors included are displayed by the color mixing tool, and the "CONVERTED COLORS" column shows how the original colors are converted, in accordance with an embodiment of the present invention.

TABLE 3

| ORIGINAL ORIGINAL COLORS | DISPLAYED COLORS | CONVERTED COLORS |
| --- | --- | --- |
| Dirty Color 1: | Process Cyan: 25% | Process Cyan: |
| C: 25% | Process Magenta: 45% | C: 100% |
| Y: 0% | Process Yellow: 50% | Y: 0% |
| M: 45% | Process Black: 10% | M: 0% |
| K: 0% | Spot Color: 25% | K: 0% |
| (Overprint fill set) | | (25% Tint) |
| Dirty Color 2: | | (Overprint fill set) |
| C: 15% | | Process Magenta: |
| Y: 50% | | C: 0% |
| M: 45% | | Y: 0% |

TABLE 3-continued

| ORIGINAL ORIGINAL COLORS | DISPLAYED COLORS | CONVERTED COLORS |
| --- | --- | --- |
| K: 0% | | M: 100% |
| (Overprint fill set) | | K: 0% |
| Dirty Color 3: | | (45% Tint) |
| C: 0% | | (Overprint fill set) |
| Y: 0% | | Process Yellow: |
| M: 0% | | C: 0% |
| K: 10% | | Y: 100% |
| (Overprint fill set) | | M: 0% |
| Spot Color 1: | | K: 0% |
| (25% Tint) | | (50% Tint) |
| (Overprint fill NOT set) | | (Overprint fill set) |
| | | Process Black: |
| | | C: 0% |
| | | Y: 0% |
| | | M: 0% |
| | | K: 100% |
| | | (10% Tint) |
| | | (Overprint fill set) |
| | | Spot Color: |
| | | C: 30% |
| | | Y: 0% |
| | | M: 90% |
| | | K: 25% |
| | | (25% Tint) |
| | | (Overprint fill NOT set) |

In the example of Table 3, there are dirty colors present. In an embodiment of the present invention, the color mixing tool or palette does not allow editing of the colors until a conversion to PPG colors has taken place. As shown in Table 3, even though the dirty colors have not yet been converted to their PPG color equivalents, they are displayed as PPG color equivalents. The color mixing tool also does not display overprint settings until a conversion to PPG color equivalents has taken place since the overall overprint is not valid without using PPG color equivalents. In an embodiment, after a conversion, all of the overprint settings are set to "Overprint Fill" except for the last color, to ensure that the colors are printed without underlying (or "background") effects showing through.

Turning to FIG. 5, a method for changing setting, information associated with one or more selected objects within a piece of digital artwork is shown, in accordance with an embodiment of the present invention. The method of FIG. 5 is executed during the user action phase of the overall method of FIG. 2. As described above, if a color setting or property is changed using the color mixing tool of the present invention, the change is applied to all selected objects. If the color mixture applied includes a new color (i.e., a color not currently included in the list of colors), then the color is added to the bottom of the list of colors of the selected object.

In an embodiment, a user of the present invention may also set a color previously included in the color mixture for an object either to "none" or to "zero". When a color in an object is set to "none", the color will not print or otherwise be used in print processing of the object. For example, if a first object containing cyan and yellow is over a second object including cyan and magenta, and the cyan in the first object is set to "none" using the present invention, then the cyan in the second object will show through the yellow of the first object. In a second example, if a first object containing cyan and yellow is set over a second object including cyan and magenta, and the cyan in the first object is set to "zero" using the present invention, then the cyan in the second object will not show through the yellow of the first object. The "none" setting is carried out in an embodiment by removing the color from the list of colors associated with an object. The "zero" setting is carried out in an embodiment by setting a color in a list of colors to a zero percentage value.

Also, in an embodiment, when the overprint button has been activated, colors are automatically reapplied, otherwise "overprint on all colors except last" is set for the selected objects. Using the method and system of the present invention, original overprint settings are kept when multiple objects are selected and changed.

The method for changing information, as shown in FIG. 5, beings in step 510 when a color mixture for a selected object (or group of objects) is changed. In step 520, the color mixing tool determines what change has been made. If the change is to an overprint setting, then the overprint setting for the selected object (or group of objects) is updated in step 530, and in step 535, the overall method (as shown, for example, in FIG. 2) resumes. If a color value is changed, then the method of FIG. 5 continues (in step 540) by taking the first object of the selected group of objects, and in step 545 checking to see if the color has been set to "none". If the color has been set to none, then, in step 555, the color is removed in step 555, and the method proceeds to step 565. Alternatively, in step 545, the color may be set to "zero" producing slightly different results (as described above).

If a color value is changed, but it is not determined to be a setting to none in step 545, then the method proceeds to step 570, where the selected object is checked for a color values that matches the color change. If the color does not match any color that has previously been added to the object, then a new color is added in step 575, and all colors set to zero are removed in step 580. If the colors had already been added to the object, then the previously added color is updated in step 585, and the method proceeds to updating of overprint settings in step 565. If the selected object is the only object to which changes have been made, or if the selected object is the last object in the selected group of objects to which changes have been made, then the method returns, in step 535, to the overall method of the present invention. If the selected object is not the last object in the selected group of objects to which changes have been made, then the method returns to step 540, and is repeated for the next object in the selected group of objects.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of applying color to an object in a native artwork production environment, the method comprising the steps of:

providing a list of colors, including at least one color selected from the group consisting of pure process colors, spot colors and dirty colors, the list of colors being provided within the native artwork production environment;

with a user action, modifying a color mixture associated with the object by applying the at least one color to the object in order to produce at least one modified object within the native artwork production environment;

extracting the color mixture of the at least one modified object within the native artwork production environment to produce an extracted color mixture; and displaying the extracted color mixture within the native artwork production environment, wherein the providing, modifying, extracting and displaying steps are repeated for each of a plurality of objects in a piece of digital artwork within the native artwork production environment, the method further comprising the steps of merging the extracted color mixture for each of the plurality of objects to produce merged color information;

tracking a number of dirty colors in the merged color information; and displaying the merged color information.

2. The method of claim 1, further comprising the steps of:

modifying at least one of the plurality of objects by changing an overprint setting in order to produce at least one object with modified overprint setting;

extracting overprint information from the plurality of objects and the at least one modified object with modified overprint setting; and displaying the overprint information.

3. The method of claim 2, further comprising the steps of:

merging overprint information for the plurality of objects to produce merged overprint information; and displaying the merged overprint information.

4. The method of claim 1, wherein the method is implemented as a plug-in for Adobe Illustrator™.

5. The method of claim 1, further comprising the step of:

converting the at least one color into a supported color mixture within the native artwork production environment.

6. The method of claim 5, wherein the at least one color is a dirty color, and the supported color mixture is a mixture of pure process colors.

7. The method of claim 5, wherein the at least one color is a dirty color, and the supported color mixture is a spot color.

8. The method of claim 5, wherein the at least one color is a dirty color, and the supported color mixture is a mixture of pure process colors and spot colors.

9. The method of claim 1, further comprising the step of:

removing an unused color from the list of colors.

10. The method of claim 1, wherein, in the step of displaying the extracted color mixture, four pure process colors are displayed even when the extracted color mixture does not include the four pure process colors.

11. A method of applying color to an object in a native artwork production environment, the method comprising the steps of:

providing a list of colors, including at least one color selected from the group consisting of pure process colors, spot colors and dirty colors, the list of colors being provided within the native artwork production environment;

with a user action, modifying a color mixture associated with tile object by applying the at least one color to the object in order to produce at least one modified object within the native artwork production environment;

converting the at least one color into a supported color mixture within the native artwork production environment;

extracting the color mixture of the at least one modified object within the native artwork production environment to produce an extracted color mixture; and displaying the extracted color mixture within the native artwork production environment, wherein the providing, modifying, converting, extracting and displaying steps are repeated for each of a plurality of objects in a piece of digital artwork within the native artwork production environment, the method further comprising the steps of merging the extracted color mixture for each of the plurality of objects to produce merged color information;

tracking a number of dirty colors in the merged color information; and displaying the merged color information.

12. The method of claim 11, further comprising the steps of:

modifying at least one of the plurality of objects by changing an overprint setting in order to produce at least one object with modified overprint setting;

extracting overprint information from the plurality of objects and the at least one modified object with modified overprint setting; and displaying the overprint information.

13. The method of claim 12, further comprising the step of:

merging overprint information for the plurality of objects to produce merged overprint information; and displaying the merged overprint information.

14. The method of claim 11, wherein the method is implemented as a plug-in for Adobe Illustrator™.

15. The method of claim 11, wherein the at least one color is a dirty color, and the supported color mixture is a mixture of pure process colors.

16. The method of claim 11, wherein the at least one color is a dirty color, and the supported color mixture is a spot color.

17. The method of claim 11, wherein the at least one color is a dirty color, and the supported color mixture is a mixture of pure process colors and spot colors.

18. The method of claim 11, further comprising the step of:

removing an unused color from the list of colors.

19. The method of claim 11, wherein, in the step of displaying the extracted color mixture, four pure process colors are displayed even when the extracted color mixture does not include the four pure process colors.

20. A system for applying color to an object in a native artwork production environment, the system comprising:

means for providing a list of colors, including at least one color selected from the group consisting of pure process colors, spot colors and dirty colors, the list of colors being provided within the native artwork production environment;

means for modifying with a user action a color mixture associated with the object by applying the at least one color to the object in order to produce at least one modified object within the native artwork production environment;

means for extracting the color mixture of the at least one modified object within the native artwork production environment to produce an extracted color mixture;

means for displaying the extracted color mixture within the native artwork production environment, wherein each of the providing, modifying, extracting and displaying means is effective for use on a plurality of objects in a piece of digital artwork within the native artwork production environment, the system further comprising means for merging the extracted color mixture for each of the plurality of objects to produce merged color information;

means for tracking a number of dirty colors in the merged color information; and means for displaying the merged color information.

21. The system of claim 20, further comprising:

means for modifying at least one of the plurality of objects by changing an overprint setting in order to produce at least one object with modified overprint setting;

means for extracting overprint information from the plurality of objects and the at least one modified object with modified overprint setting; and means for displaying, the overprint information.

22. The system of claim 21, further comprising:

means for merging overprint information for the plurality of objects to produce merged overprint information; and means for displaying the merged overprint information.

23. The system of claim 20, further comprising:

means for converting the at least one color into a supported color mixture within the native artwork production environment.

24. The system of claim 23, wherein the at least one color is a dirty color, and the supported color mixture is a mixture of pure process colors.

25. The system of claim 23, wherein the at least one color is a dirty color, and the supported color mixture is a spot color.

26. The system of claim 23, wherein the at least one color is a dirty color, and the supported color mixture is a mixture of pure process colors and spot colors.

27. The system of claim 20, further comprising:
means for removing an unused color from the list of colors.

* * * * *